C. E. A. ESSE & G. W. WATSON.
GEARING.
APPLICATION FILED MAR. 28, 1910.

1,051,990.

Patented Feb. 4, 1913.

3 SHEETS—SHEET 1.

WITNESSES
W. P. Burk
John A. Percival

INVENTORS
Charles E. A. Esse
George W. Watson

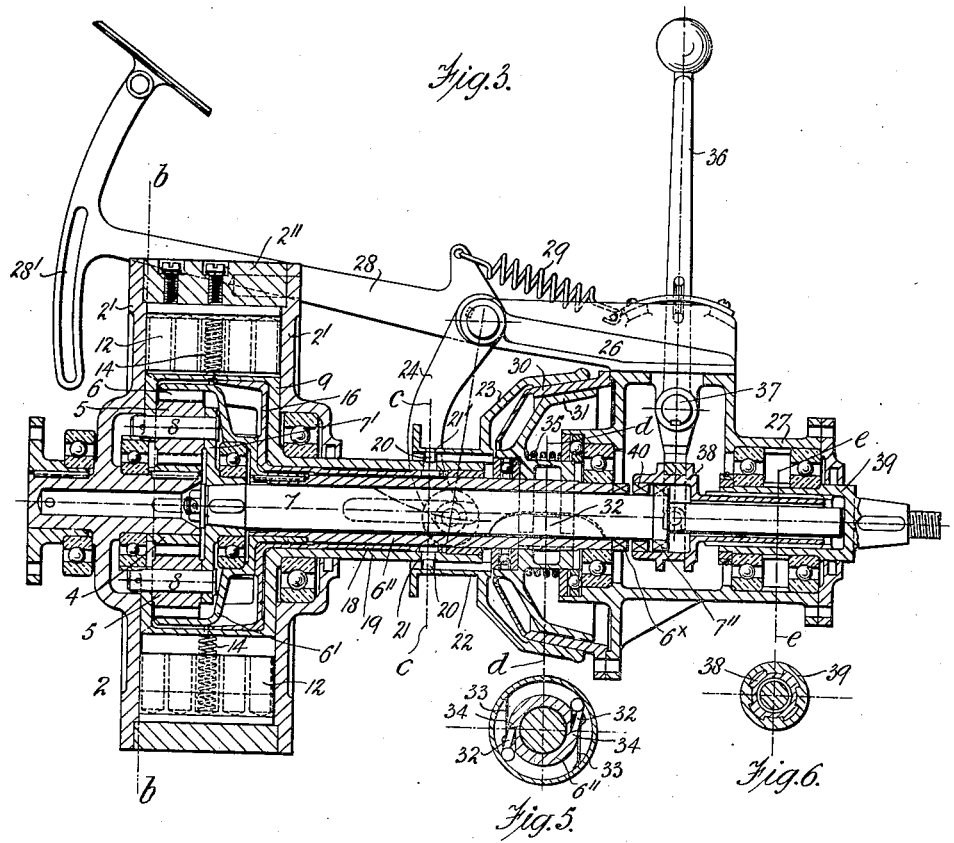

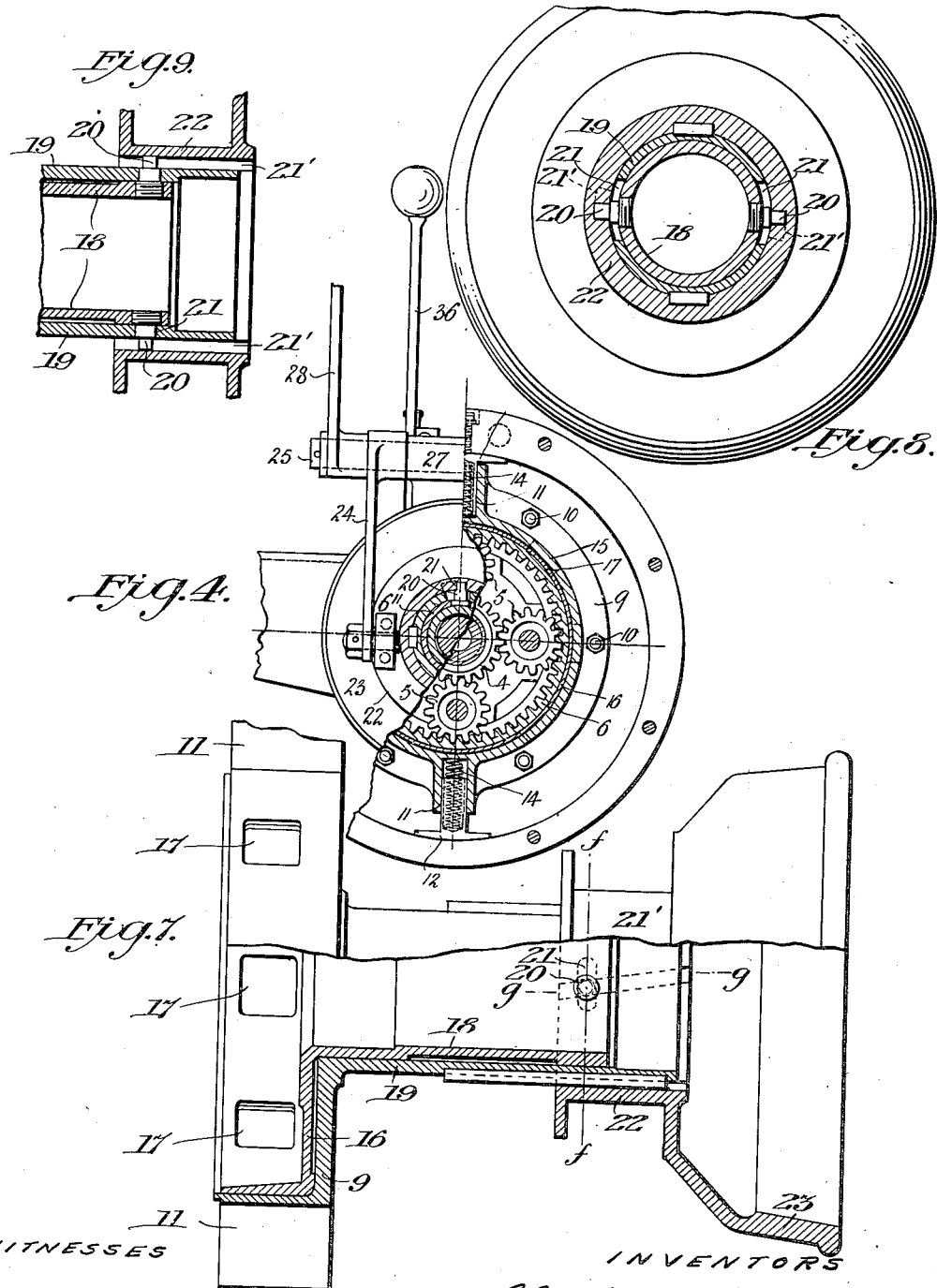

UNITED STATES PATENT OFFICE.

CHARLES EDWARD ADOLPHUS ESSE, OF BARNES, AND GEORGE WILLIAM WATSON, OF EAST SHEEN, ENGLAND.

GEARING.

1,051,990.  Specification of Letters Patent.  Patented Feb. 4, 1913.

Application filed March 28, 1910. Serial No. 552,033.

*To all whom it may concern:*

Be it known that we, CHARLES EDWARD ADOLPHUS ESSE, residing at 28 Station road, Barnes, in the county of Surrey, England, and GEORGE WILLIAM WATSON, of 20 Ormonde road, East Sheen, in the county of Surrey, England, both subjects of the King of Great Britain and Ireland, have invented certain new and useful Improvements in Gearing, of which the following is a specification.

The invention relates to hydraulic clutch mechanism and to that variety of such clutch mechanism in which reverse is obtained through the medium of an epicyclic gearing.

The invention broadly consists of the combination of an epicyclic gearing and a hydraulic clutch of that kind in which the variable transmitting means interposed between the driving and driven shafts comprises a drum or casing connected to the driving shaft and eccentrically disposed with respect to the common axis of both shafts, a rotatable member consisting of a hollow head, contained within the drum or casing and provided with a suitable number of radially guided shoes adapted to contact with the inner surface of the drum or an interposed ring so as to divide the interior of the drum or casing into two or more pockets, and means, under the control of an operator, for limiting the flow of oil or the like between the pockets.

Two embodiments of the invention are illustrated by the accompanying drawings.

Figure 1:
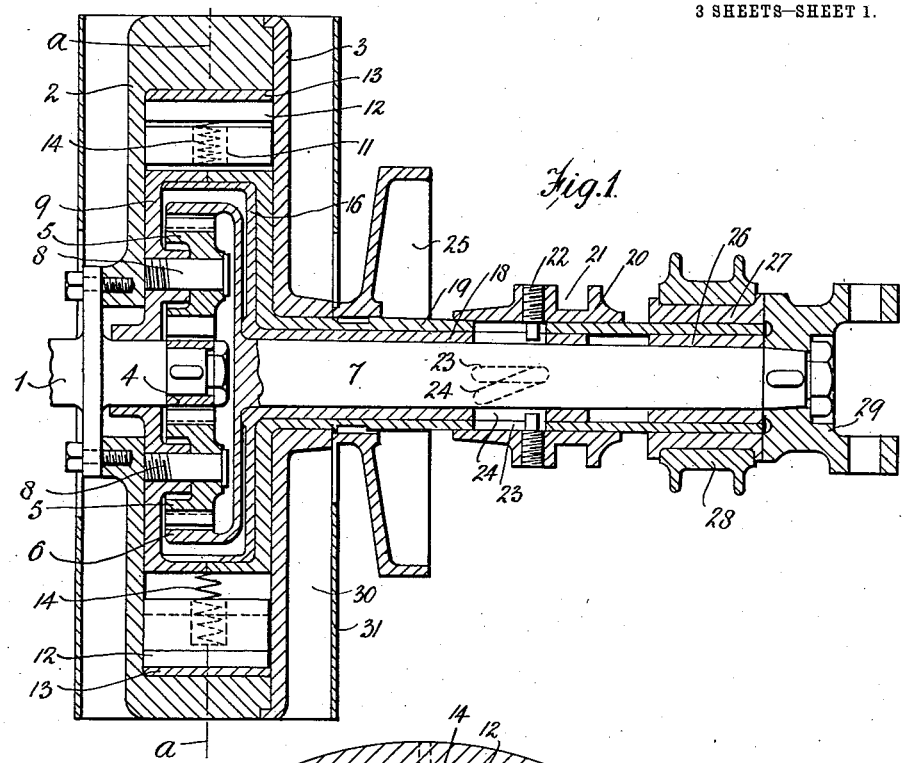
Figure 2:
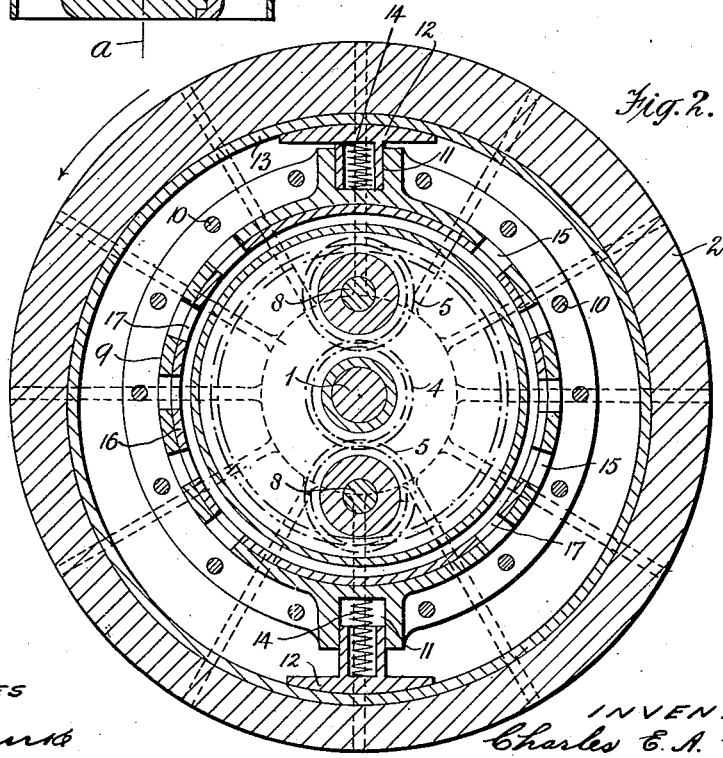

Figure 1 is a longitudinal section of the one embodiment and Fig. 2 is a transverse section thereof taken on the line $a$—$a$ of Fig. 1. Fig. 3 is a longitudinal section of the second embodiment. Fig. 4 illustrates said embodiment in transverse section on the lines $b$—$b$ and $c$—$c$ of Fig. 3, that on the right hand side of the figure illustrating the section on the line $b$—$b$ and that on the left hand side of the figure the section on the line $c$—$c$. Figs. 5 and 6 are transverse sections of Fig. 3 on the lines $d$—$d$ and $e$—$e$. Fig. 7 is a part elevation and part longitudinal section illustrating, on an enlarged scale, certain details of the hollow head and rotatable valve, shown in Figs. 3 to 6, and certain parts coöperating therewith. Fig. 8 is a section of Fig. 7 taken on the line $f$—$f$, and Fig. 9 is a section of Fig. 7 taken on the line $g$—$g$.

Referring first to Figs. 1 and 2, 1 is the driving shaft and 2 is a hollow drum or casing secured to the shaft 1 through the medium of a flange on the latter. 3 is a cover which completes the drum 1. 4 is a toothed wheel secured to the driving shaft and forming the sun wheel of an epicyclic gearing. The wheel 4 meshes with one or more planetary pinions 5 and these in turn engage with an internally toothed ring 6 which is either integral with the driven shaft 7, as shown, or is made separate and secured to same. The planetary pinions 5 are rotatably mounted on pins 8 which are fixed to a hollow head 9. The head 9 is formed in two parts, secured together by bolts 10, and is provided with radially disposed peripheral pockets 11 for the reception of sliding shoes 12. The shoes 12 are forced against the inner surface of the drum 1 or of an interposed floating ring 13 by means of springs 14. The shoes 12 divide the annular space obtaining between the hollow head 9 and the inner face of the floating ring 13 into two pockets and as the bore of the drum 2 is eccentrically disposed with respect to the axis of the hollow head 9 the two parts coöperate in such manner that relative movement of the head 9 and the drum 2 decreases or increases the capacities of the pockets. A suitable liquid fills the pockets of the drum 2 and the head 9 and this liquid as the capacities of the pockets are varied is driven from one pocket to another through ports 15 formed in the head 9. 16 is a rotatable valve which is provided with ports 17 corresponding in number and angular spacing to the ports 15 and serves as a means for controlling the passage of liquid from one pocket to another. The valve 16 is integral with a sleeve 18 which is loosely mounted on the driven shaft 7 and is surrounded by a similar sleeve 19 forming part of the head 9. 20 is a collar which is slidably mounted on the sleeve 19 and is formed with a groove 21 for the engagement of an actuating lever. 22 are pins secured to the collar 20 and passing through straight slots 23 in the sleeve 19 and helical slots 24 in the sleeve 18 The valve 16, the head 9 and the collar 20 normally rotate together, but when the collar 20 is moved axially the relative angular positions of the head 9 and the valve 16 are altered and the areas of the passages afforded by the ports 15 and 17 varied. 25 is a brake drum which is keyed or otherwise secured to the sleeve 19 of the hollow head 9, and 26 is a short sleeve supporting the outer end of the driven shaft 7. 27 is a bearing supporting the outer end of the sleeve 19 and 28 is a bracket supporting the bearing 27. 29 is part of a universal joint of ordinary construction. The sides of the drum 2 and the cover 3 are preferably formed with webs 30 and over these webs are placed casings 31.

The operation of the above described mechanism is as follows:—As the drum 2 and the sun wheel 4 rotate in the direction of the arrow shown in Fig. 2 the planetary pinions 5 will be rotated on their axes in the opposite direction to that of the wheel 4, and as the pinions 5 also mesh with the internally toothed ring 6 on the shaft 7, the shaft 7 would, if it offered no resistance to rotary motion, be rotated in a reverse direction to the wheel 4. The shaft 7 however is connected to the machinery which it is intended to drive and is therefore under load and the resistance thus offered to its rotary motion will cause the pinions 5 to travel around the inside of the toothed ring 6 but at a reduced speed, which is proportional to $$\frac{A}{A+B}$$

where A and B represent the number of teeth in the wheel 4 and the toothed ring 6 respectively. When traveling around the toothed ring 6, the pinions 5 carry with them the hollow head 9. Relative rotary movement thus takes place between the head 9 and the drum 2 and so long as the ports 15 remain open to their fullest extent, so as not to interfere with the free passage of liquid from one of the aforesaid pockets to the one diametrically opposite to it, the head 9 will continue to rotate at a slower speed than the drum 2. If now the collar 20 is moved to the left of Fig. 1 the ports 15 in the head 9 will be partially closed, and consequently the liquid will not be able to flow from one pocket to another at a rate corresponding to the variations in the capacities of the pockets. The consequence of this is that the speed of the head 9 will be accelerated and the toothed ring 6 and the shaft 7 will commence to rotate and transmit power. As the ports 15 are closed still more, the head 9, the toothed ring 6 and the shaft 7 will rotate more nearly at the same speed as the sun wheel 4 and when said ports are quite closed so as to prevent the passing of any liquid the whole mechanism will rotate as one piece and the shaft 7 will be driven at the same speed as the shaft 1, the epicyclic gear being inoperative. In order to drive the shaft 7 in the reverse direction to the shaft 1 the ports 15 are opened to their fullest extent and a brake band or shoe is applied to the surface of the brake drum 25 or other means employed to prevent the head 9 rotating on its axis. The drive is then transmitted by the wheel 4 and the pinions 5 to the toothed ring 6 which is thus caused to rotate in a reverse direction to the wheel 4 in the ratio $\frac{A}{B}$, A and B representing the same values as before.

Figs. 3, 4, 5, 6, 7, 8 and 9 illustrate substantially the same arrangement of parts as those already described with reference to Figs. 1 and 2, and for the purpose of ready identification of similarly constructed parts the same reference figures are, as far as possible, used in both cases.

Referring now to Figs. 3 to 9, 2 is a hollow drum secured to the driving-shaft (not shown) and is formed in the present case of a pair of disks 2' and an intermediate ring 2''. 4 is the sun wheel of the epicyclic gearing and 5 are the planetary pinions thereof. The pinions 5 are loosely mounted on pins 8. The pins 8 are fixed at one of their ends to a hollow head hereinafter referred to and are supported at their other ends by a disk 7' which is keyed to the driven shaft 7. The pinions 5 mesh with the sun wheel 4 and with an internally toothed ring 6 integral with a disk 6'. The disk 6' is keyed to a sleeve 6'' fitting on to the driven shaft 7. The sleeve 6'' is provided at its end which is remote from the disk 6' with a suitable number of claws 6×. 9 is a hollow head which is formed in two parts, secured to one another by means of bolts 10, and is provided with radially disposed peripheral pockets 11 for the reception of sliding shoes 12. The shoes 12 are forced into contact with the surface of the ring 2'' of the drum 2 by means of springs 14. The shoes 12 divide the annular space obtaining between the hollow head 9 and the drum 2 into two pockets, and the bore of the drum 2 is eccentrically disposed with respect to the axis of the head 9. 15 are ports formed in the head 9, which together with the drum 2 is filled with a suitable liquid, and 16 is a rotatable valve provided with ports 17 corresponding in number and angular spacing to the ports 15 and adapted to co-act therewith as in the previously described embodiment of the invention. The rotatable valve 16 is integral with a sleeve 18 which fits on to the sleeve 6'' of the disk 6', and the head 9 is provided with a similar sleeve 19 which embraces the sleeve 18. 20 are studs secured to the sleeve 18. The studs 20 project through segmental slots 21 formed in the sleeve 19 and engage with helical slots 21' formed in a slidable collar 22. The collar 22, which is formed in one with a cone 23, is adapted to be actuated at the required times by means of a lever 24. This lever 24 is secured to a rock shaft 25 which is mounted in a bracket 26 secured to a fixed casting 27. The shaft 25 is rocked by the depression of a pedal lever 28 and the latter is retracted by means of a spring 29 and is provided with a slot 28'. 30 is a fixed cone supported from the casting 27 and serving as a brake surface for the cone 23 and as an abutment for a second cone 31. The cone 31 is slidably mounted by means of its hub on the sleeve 6'' of the toothed ring 6 and is provided with pawls 32 which are pressed by means of springs 33 into engagement with notches 34 formed in the sleeve 6'', this arrangement of pawls 32 and notches 34 constituting a free-wheel device. 35 is a spring which encircles the hub of the cone 31 and bears at its ends against said cone and a part fixed to the casting 27. 36 is a hand lever fixed at its center to a rock shaft 37 which is supported by the casting 27. The lower end of the lever 36 engages with a slidable sleeve 38. The rear end of the sleeve 38 is slidably and non-rotatably mounted in a short tubular shaft 39 revolubly mounted in the casting 27. The front end of the sleeve 38 is made hollow and is provided with claws 40 which are adapted, when the hand lever 36 is moved, to engage either with the claws 6ˣ on the sleeve 6'' or with claws 7'' on the end of the driven shaft 7. When it is desired to obtain a forward drive the pedal lever is depressed so as to disengage the slidable cone 31 from the fixed cone 30 and the hand lever 36 is moved so as to cause the claws 40 of the slidable sleeve 38 to become engaged with the claws 7'' on the driven shaft 7.

The action of the mechanism will then be as follows:—As the drum 2 and the sun wheel 4 revolve the planetary pinions 5 will be rotated on their axes in the opposite direction, and, as the pinions also engage with the internally toothed ring 6, the ring 6 and the sleeve 6'', to which it is keyed, will be rotated in the opposite direction unless resistance is offered to their revolving. The pedal 28 is then allowed to rise and by the first part of its movement disengages the cone 23 from the fixed cone 30. The cone 31 is then forced by the spring 35 into engagement with the fixed cone 30. The engagement of the cones 30 and 31 arrests the backward rotation of the sleeve 6'' and the internally toothed ring 6 owing to the pawls 32 being held against rotation. The pinions 5 are thus compelled to creep around the toothed ring 6 in the same direction as the sun wheel 4 is rotating but at a speed proportional to $$\frac{A}{A+B},$$

A representing the number of teeth in the sun wheel 4 and B the number of teeth in the toothed ring 6. The pinions 5, as they travel around the toothed ring 6, rotate the head 9 in which their spindles are housed. Relative rotary movement between the drum 2 and the head 9 results and as long as the ports 15 in the head 9 are open to the fullest extent, so as not to interfere with the free passage of the oil or other fluid from one side of the shoes 12 to the other side thereof, the head 9 will continue to be driven at a slower speed than the drum 2. If the slidable sleeve 22 is moved in the direction of the left of Fig. 3 so as to cause the ports 15 in the head 9 to be partly closed by the ports 17 of the valve 16 the oil or other liquid will not be able to flow from one side of the shoes 12 to the other side thereof as quickly as the capacities of the two pockets are varied. Consequently interference with the free passage of the oil or the like causes the speed of the rotation of the head 9 to be accelerated. The toothed ring 6 and its sleeve 6'' will then commence to revolve in the same direction as the driving shaft 1, and the sleeve 6'' to rotate inside the hub of the cone 31 and the notches 34 past the pawls 32. If the ports 15 are closed still more the head 9 and the drum 2 will rotate more nearly at the same speed, and, when the ports 15 are wholly closed, all the parts will rotate as one piece, the epicyclic gearing being then inoperative. The vertical rise of the pedal 28 may be limited by a pin engaging with the slot 28' and controlled by a hand lever mounted in a convenient position say, in the case of a motor car, on the steering wheel of the car. When this lever has been set for any particular speed the pedal may be brought to the zero position without affecting the adjustment of the hand lever. In order to obtain a drive in a reverse direction the slidable sleeve 38 is moved so as to cause its claws 40 to engage with the claws 6ˣ on the end of the sleeve 6''. This movement is performed while the pedal 28 is depressed about three-quarters of its total movement. When the pedal 28 is in that position the ports 15 in the head 9 are fully open and the cone 23 is disengaged from the fixed cone 30. Further downward movement of the pedal 28 will cause the cone 23 to be pressed into contact with the fixed cone 31 which then serves the purpose of a brake surface and prevents the rotation of the sleeve 19 and the head 9. The drive is then transmitted by the sun wheel 4 through the pinions 5, which no longer travel around the sun wheel 4, to the toothed ring 6 and by reason of the cone 31 not being engaged with any fixed part the sleeve 6'' can rotate in the opposite direction to the sun wheel 4. The drive is transferred from the sleeve 6'' through the slidable sleeve 38 to the tubular shaft 39.

Having now described our invention what we desire to secure by Letters Patent is as follows:—

In epicyclic gearing the combination of a driving shaft 1, a hollow drum 2 secured to the driving shaft 1, a hollow head 9 provided with a sleeve 19 and with radially disposed peripheral pockets 11, spring-actuated shoes 12 guided by the pockets 11 and bearing against the inner surfaces of the hollow drum 2, a sun wheel 4 fixed to the center of the hollow drum 2, a driven shaft 7, a disk 7' secured thereto, pins 8 supported by the hollow head 9 and by the disk 7', planetary pinions 5 rotatably mounted on the pins 8, an internally toothed ring 6 engaging with the pinions 5 and fixed to a sleeve 6'', a rotatable valve 16 bearing against the inner periphery of the hollow head 9 and formed integral with a sleeve 18 located between the sleeves 6'' secured to the ring of teeth 6 and the sleeve 19 of the hollow head 9, the hollow head 9 and the rotatable valve 16 being provided with ports 15 and 17 respectively, a collar 22 slidably mounted on the sleeve 19 of the hollow head 9 and formed with helical slots 21', said collar being provided with a cone 23, studs 20 secured to the sleeve 18 of the rotatable valve 16 and passing through the helical slots 21' provided in the collar 22 and in segmental slots 21 formed in the sleeve 19 of the hollow head 9, a cone 31 slidably mounted on the sleeve 6'' of the toothed ring 6 and provided with pawls 32 engaging with notches 34 in the sleeve 6'', a fixed cone 30 supported from a casting 27 and serving as a brake surface for the cone 23 and as an abutment for the cone 31, a spring 35 encircling the hub of the cone 31 and tending to constantly press the cone 31 toward the fixed cone 30, a sleeve 38 supported on the outer end of the driven shaft 7 and slidably and non-rotatably mounted in a tubular shaft 39, the front of the sleeve 38 being provided with claws 40 and the end of the sleeve 6'' of the toothed ring 6' and the end of the driven shaft 7 being provided with claws $6^x$ and 7'' respectively coöperating with the claws 40, a lever 36 operatively connected to the sleeve 38, a rock shaft 25, a spring-actuated pedal 28 secured to the rock shaft 25, and a lever 24 fixed to the rock shaft 25 and operatively connected with the slidable cone 23, substantially as described.

In witness whereof we have hereunto set our hands in presence of two witnesses.

CHARLES EDWARD ADOLPHUS ESSE.
GEORGE WILLIAM WATSON.

Witnesses:
ARTHUR F. ENNIS,
RIPLEY WILSON.